(12) United States Patent
Ferris et al.

(10) Patent No.: US 10,302,937 B2
(45) Date of Patent: May 28, 2019

(54) HEAD-UP DISPLAY SYSTEM AND DEVICE

(71) Applicant: GM GLOBAL TECHNOLOGY OPERATIONS LLC, Detroit, MI (US)

(72) Inventors: Leslie G. Ferris, Clinton Township, MI (US); Thomas A. Seder, Northville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/218,335

(22) Filed: Jul. 25, 2016

(65) Prior Publication Data

US 2017/0038584 A1 Feb. 9, 2017

Related U.S. Application Data

(60) Provisional application No. 62/202,270, filed on Aug. 7, 2015.

(51) Int. Cl.
| | |
|---|---|
| *G02B 27/01* | (2006.01) |
| *G02B 1/118* | (2015.01) |
| *G02B 1/115* | (2015.01) |
| *G02B 27/28* | (2006.01) |

(52) U.S. Cl.
CPC .......... *G02B 27/0101* (2013.01); *G02B 1/115* (2013.01); *G02B 1/118* (2013.01); *G02B 27/28* (2013.01); *G02B 2027/0121* (2013.01)

(58) Field of Classification Search
CPC .... G02B 27/0101; G02B 1/115; G02B 1/118; G02B 27/28; G02B 2027/012; G02B 2027/0121

USPC .......................................................... 359/581
See application file for complete search history.

(56) References Cited

U.S. PATENT DOCUMENTS

| | | | | |
|---|---|---|---|---|
| 5,753,373 A | * | 5/1998 | Scholz | C09D 1/00 106/287.11 |
| 6,744,478 B1 | * | 6/2004 | Asakura | G02B 27/0101 349/11 |
| 2009/0303604 A1 | * | 12/2009 | Martin | B32B 17/10036 359/630 |

(Continued)

FOREIGN PATENT DOCUMENTS

| | | |
|---|---|---|
| CN | 1166878 A | 12/1997 |
| CN | 106444022 A | 2/2017 |

(Continued)

*Primary Examiner* — Wen Huang
(74) *Attorney, Agent, or Firm* — Harness, Dickey & Pierce, P.L.C.

(57) ABSTRACT

A head-up display system includes a projector configured for emitting a first ray of light having a first intensity, and a lens having a first surface facing the projector and a second surface spaced apart from the first surface. The lens is configured for refracting the first ray of light to emit from the second surface a second ray of light having a second intensity that is less than the first intensity, and a third ray of light that is parallel to the second ray of light and has a third intensity that is less than the second intensity. The system also includes a cured film disposed on the first surface and formed from an anti-reflection coating composition, wherein the cured film is configured for minimizing the third intensity. A device includes a windshield, an operator eyebox spaced apart from the windshield, and the head-up display system.

18 Claims, 2 Drawing Sheets

(56) References Cited

U.S. PATENT DOCUMENTS

| | | | | |
|---|---|---|---|---|
| 2014/0177064 A1* | 6/2014 | Sugiyama | .......... | G02B 27/0101 |
| | | | | 359/630 |
| 2016/0091635 A1* | 3/2016 | Ibuki | ...................... | G02B 1/118 |
| | | | | 15/209.1 |
| 2016/0187650 A1* | 6/2016 | Mills | ...................... | A42B 3/042 |
| | | | | 345/8 |

FOREIGN PATENT DOCUMENTS

| DE | 102016214390 A1 | 2/2017 |
|---|---|---|
| EP | 0421886 A1 | 4/1991 |
| EP | 0536763 A1 | 4/1993 |

\* cited by examiner

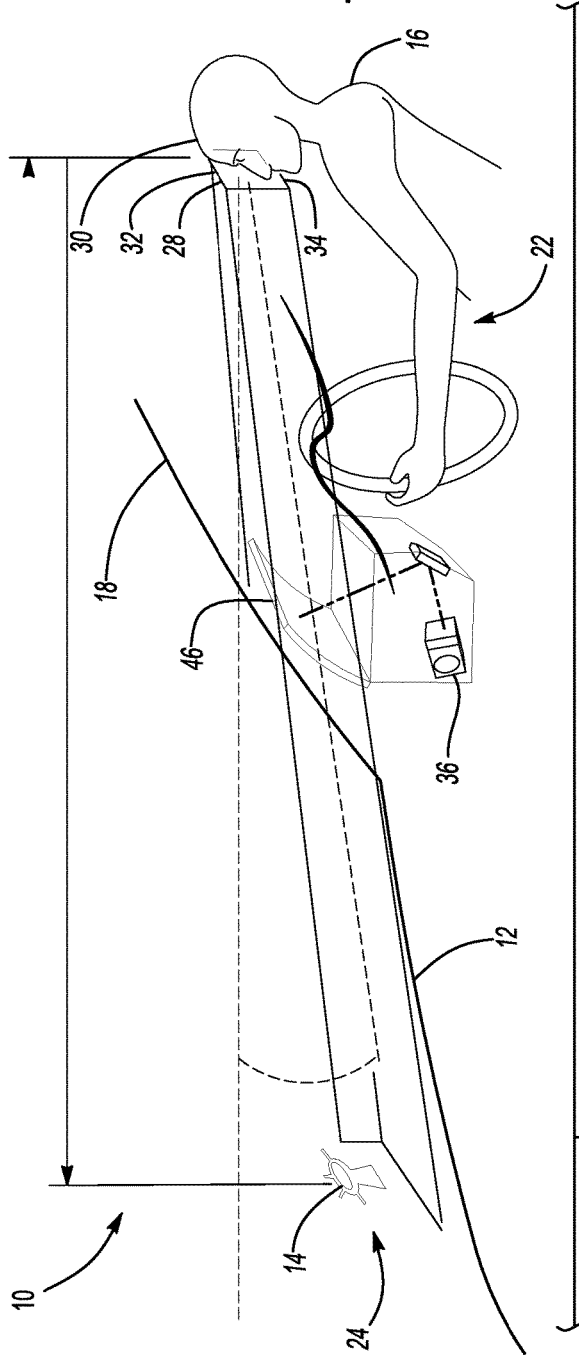

HEAD-UP DISPLAY SYSTEM AND DEVICE

CROSS-REFERENCE TO RELATED APPLICATIONS

This application claims the benefit of U.S. Provisional Application No. 62/202,270, filed on Aug. 7, 2015, which is hereby incorporated by reference in its entirety.

TECHNICAL FIELD

The disclosure relates to a head-up display system and a device.

BACKGROUND

A head-up display or HUD is a transparent display that presents data to an operator of a device, such as a vehicle or a component, without requiring the operator to look away from a given field of view. For example, a HUD for an automotive vehicle may present speedometer data, tachometer data, fuel level data, and/or navigational data to a driver as the driver looks straight ahead through a windshield of the automotive vehicle. Similarly, a HUD for an aircraft may present altitude, airspeed, heading, and/or a horizon line to a pilot as the pilot looks straight ahead through a windshield or canopy of the aircraft. Likewise, a HUD for a helmet, visor, goggles, or eyeglasses may present images and/or text to a wearer through a lens of the helmet, visor, goggles, or eyeglasses.

SUMMARY

A head-up display system includes a projector configured for emitting a first ray of light having a first intensity, and a lens having a first surface facing the projector and a second surface spaced apart from the first surface. The lens is configured for refracting the first ray of light to emit from the second surface a second ray of light having a second intensity that is less than the first intensity, and a third ray of light that is parallel to the second ray of light and has a third intensity that is less than the second intensity. The head-up display system also includes a cured film disposed on the first surface and formed from an anti-reflection coating composition, wherein the cured film is configured for minimizing the third intensity.

In one embodiment, the first ray of light and the first surface define an incident angle therebetween of from 0° to 60°. Further, the first intensity is 100 arbitrary units, the second intensity is at least 93 arbitrary units, and the third intensity is less than 0.1 arbitrary unit. In addition, the second ray of light forms a primary image having a first luminance and the third ray of light forms a ghost image that is offset from the primary image with respect to the second surface. The ghost image has a second luminance that is less than the first luminance. A ratio of the first luminance to the second luminance is less than 1:0.02.

A device includes a windshield and an operator eyebox spaced apart from the windshield. The device also includes a head-up display system configured for producing a primary image visible at the windshield when viewed from the operator eyebox. The head-up display system includes a projector configured for emitting a first ray of light having a first intensity. The head-up display system also includes a lens disposed between and spaced apart from the windshield and the operator eyebox. The lens is configured for refracting the first ray of light to emit from the second surface a second ray of light having a second intensity that is less than the first intensity, and a third ray of light that is parallel to the second ray of light and has a third intensity that is less than the second intensity. The head-up display system also includes a cured film disposed on the first surface and formed from an anti-reflection coating composition, wherein the cured film is configured for minimizing the third intensity.

The above features and advantages and other features and advantages of the present disclosure will be readily apparent from the following detailed description of the preferred embodiments and best modes for carrying out the present disclosure when taken in connection with the accompanying drawings and appended claims.

BRIEF DESCRIPTION OF THE DRAWINGS

FIG. 1 is a schematic illustration of a side view of a device including a head-up display system;

FIG. 2 is a schematic illustration of a perspective view of a projector and a lens of the head-up display system of FIG. 1;

DETAILED DESCRIPTION

Figure 3:
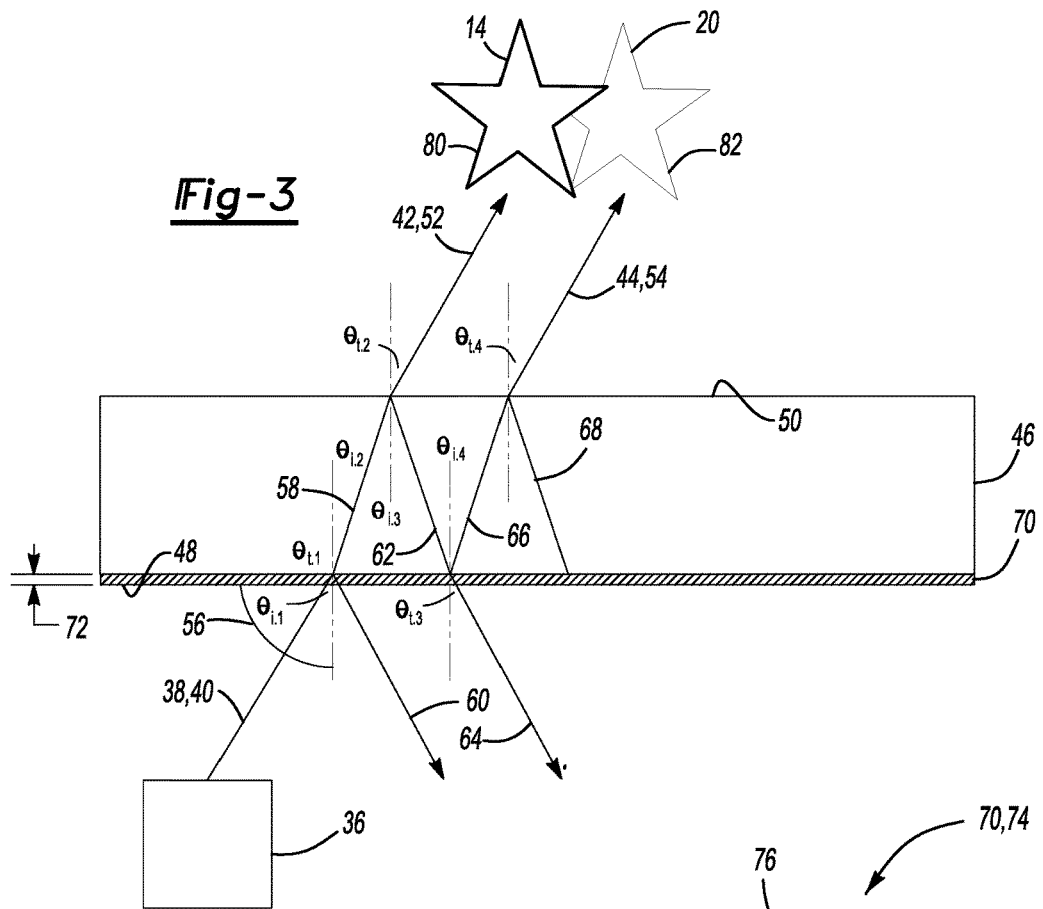
FIG. 3 is a schematic illustration of a cross-sectional view of the lens of FIG. 2 taken along section lines 3-3, wherein a cured film is disposed on the lens.

Referring to the Figures, wherein like reference numerals refer to like elements, a head-up display system 10 for a device 12 is shown generally in FIGS. 1 and 2. The head-up display system 10 may be useful for presenting data such as a primary image 14 to an operator 16 of the device 12 without requiring the operator 16 to look away from a given field of view. For example, the device 12 may be a vehicle, such as an automotive vehicle or an aircraft, or may be a component, such as a helmet or eyeglasses. The head-up display system 10 may project the primary image 14 through a transparent element, such as a windshield 18 (FIG. 1), a cockpit canopy (not shown), a visor of a helmet (not shown), or a lens of eyeglasses (not shown). The head-up display system 10 presents bright, crisp, and clear images 14 which are substantially free from visible ghosting. That is, as described with reference to FIG. 3, ghosting generally occurs when a ghost image 20, i.e., a secondary image that is similarly shaped to and offset or slightly displaced from the primary image 14, is visible to the operator 16. For example, ghost images 20 often appear slightly above the primary image 14. However, any ghost image 20 of the present head-up display system 10 is inconspicuous or squelched so that the head-up display system 10 presents a clear primary image 14.

As used herein, to clarify, the ghost image 20 is distinguished from a windshield ghost image (not shown). That is, the windshield ghost image may occur due to reflection of the primary image 14 off an outer surface of a windshield 18 and may be remedied by, for example, laminating a wedge-shaped element between inner and outer windshield layers. The ghost image 20 discussed herein originates from a lens 46 of the head-up display system 10, as set forth in more detail below.

Referring again to FIG. 1, in one embodiment, the device 12 may be an automotive vehicle such as a passenger car or truck. Alternatively, the device 12 may be another vehicle type, such as, but not limited to, an industrial vehicle, a recreational off-road vehicle, a motorcycle, and the like. The device 12 includes the windshield 18 that may be configured for protecting the operator 16 from debris and/or moisture while the device 12 is in motion or use. The windshield 18 may be formed from a plurality of layers (not shown) that are laminated together, and the windshield 18 may separate an interior passenger compartment 22 of the device 12 from an external environment 24 in which the device 12 operates. Alternatively, for non-automotive applications, the windshield 18 may be a visor of a helmet, a lens of eyeglasses or goggles, and the like. Regardless, the device 12 may have a lowest surface 26, and the windshield 18 may be spaced apart from the lowest surface 26.

As described with continued reference to FIG. 1, the device 12 also includes an operator eyebox 28 spaced apart from the windshield 18. The operator eyebox 28 may generally correspond to an area in which a head 30 of the operator 16 may move while the operator 16 gazes ahead through the windshield 18. That is, the operator eyebox 28 may correspond to a box situated directly in front of the operator 16 through which the operator 16 may view the primary image 14 presented by the head-up display system 10 without tilting and/or rotating his head more than about 20° up, down, left, and/or right. The operator eyebox 28 has a top 32 and a bottom 34 disposed between the top 32 and the lowest surface 26 of the device 12.

Referring again to FIG. 1, the device 12 further includes the head-up display system 10. The head-up display system 10 is configured for producing the primary image 14 visible at the windshield 18 when viewed from the operator eyebox 28. More specifically, as described with reference to FIG. 3, the head-up display system 10 includes a projector 36 configured for emitting a first ray of light 38 having a first intensity 40. The first ray of light 38 may be polarized light. In particular, the first ray of light 38 may have an s-polarization state or a p-polarization state.

The projector 36 may be any suitable light source arranged to emit the first ray of light 38. For example, the projector 36 may include optics to focus, magnify, refract, and/or reflect light, and may define one or more apertures (not shown). In a non-limiting example, the projector 36 may emit the first ray of light 38 from a light-emitting diode. The first intensity 40 of the first ray of light 38 may be, for example, 100 arbitrary units. As used herein, the terminology arbitrary units refers to a relative unit of measurement which describes a ratio between an intensity, e.g., the first intensity 40, and a predetermined reference measurement. The arbitrary unit compares multiple measurements performed in a given environment using given procedures and describes a relationship between two quantities, e.g., between the first intensity 40 and a second intensity 42 or between the first intensity 40 and a third intensity 44.

Referring now to FIGS. 2 and 3, the head-up display system 10 also includes the lens 46 having a first surface 48 facing the projector 36 and a second surface 50 spaced apart from the first surface 48. That is, the first surface 48 may be disposed closest to the projector 36 and the second surface 50 may be disposed closest to the operator 16. In one embodiment, the lens 46 may be characterized as a combiner and may be disposed between the operator 16 and the windshield 18. The lens 46 may redirect or refract the first ray of light 38 projected from the projector 36 in such a way so that a field of view through the windshield 18 and the primary image 14 are visible at the same time by the operator 16.

The lens 46 may be formed from a transparent dielectric material and may have a suitable thickness according to a desired application of the head-up display system 10. More specifically, the transparent dielectric material may have a refractive index at a wavelength of 588 nm of from 1.45 to 1.6. In one non-limiting embodiment, the lens 46 may be formed from polymethyl methacrylate and may have a refractive index of 1.493. In another non-limiting embodiment, the lens 46 may be formed from polycarbonate and may have a refractive index of 1.589.

Referring now to FIG. 3, the lens 46 is configured for refracting the first ray of light 38 to emit from the second surface 50 a second ray of light 52 and a third ray of light 54 that is parallel to the second ray of light 52. The first ray of light 38 may be projected by the projector 36 at the first surface 48 to define an incident angle 56. Importantly, since the lens 46 may be curved, the first ray of light 38 may intersect the first surface 48 and define a comparatively high incident angle 56 therebetween. In one embodiment, the first ray of light 38 and the first surface 48 may define the incident angle 56 of from 0° to 90°, e.g., from 0° to 60° or from 0° to 55° or from 0° to 50° or from 0° to 45° or from 0° to 40° or from 0° to 35° or from 0° to 30° or from 0° to 25° or from 0° to 20° of from 0° to 15° or from 0° to 10° or from 0° to 5°. The head-up display system 10 and lens 46 are suitable for comparatively high incident angles 56 in which the first ray of light 38 does not transmit through the first surface 48 head-on or normal to the first surface 48.

The second ray of light 52 has the second intensity 42 that is less than the first intensity 40, and the third ray of light 54 has the third intensity 44 that is less than the second intensity 42. That is, as the first ray of light 38 crosses the first surface 48 and enters the lens 46, the lens 46 may refract the first ray of light 38 such that the second ray of light 52 exits the second surface 50 and has a lesser intensity, i.e., the second intensity 42. For example, as the first ray of light 38 crosses the first surface 48, the first ray of light 38 may split into a first portion 58 and a second portion 60. The first portion 58 may transmit through the lens 46 from the first surface 48 to the second surface 50, and the second portion 60 may reflect off the first surface 48.

Further, as the first portion 58 contacts the second surface 50, a third portion 62 of the first ray of light 38 may reflect off the second surface 50 towards the first surface 48. The third portion 62 may then split at the first surface 48 such that a fourth portion 64 of the first ray of light 38 is emitted from the first surface 48 and a fifth portion 66 reflects off the first surface 48 towards the second surface 50. As the fifth portion 66 contacts the second surface 50, the fifth portion 66 may split such that the third ray of light 54 is emitted from the second surface 50 and a sixth portion 68 of the first ray of light 38 is reflected from the second surface 50 to the first surface 48.

It is to be appreciated therefore that the first surface 48 both refracts the first ray of light 38 to form the first portion 58 and reflects the first ray of light 38 off the first surface 48 to form the second portion 60. Further, the second surface 50 transmits the first portion 58 such that the lens 46 emits the second ray of light 52 and the second surface 50 reflects the third portion 62 towards the first surface 48. The first surface 48 then refracts and emits the second portion 60 and reflects the fifth portion 66 towards the second surface 50. At the second surface 50, the third portion 62 is emitted from the lens 46 while the sixth portion 68 is reflected off the second surface 50 towards the first surface 48.

As the first ray of light 38 travels through the lens 46, the first intensity 40 may be diminished. Therefore, the second intensity 42 of the second ray of light 52 may be less than the first intensity 40, and the third intensity 44 of the third ray of light 54 may be less than the second intensity 42. As non-limiting examples, the second intensity 42 may be at least 93 arbitrary units or at least 95 arbitrary units and the third intensity 44 may be less than 0.1 arbitrary unit or less than 0.05 arbitrary units or less than 0.04 arbitrary units. At second intensities 42 of less than 93 arbitrary units and/or third intensities 44 of greater than or equal to 0.1 arbitrary unit, the primary image 14 presented by the head-up display system 10 may be blurry, fuzzy, unclear, and/or may include the ghost image 20, as set forth in more detail below.

That is, as described with continued reference to FIG. 3, the head-up display system 10 also includes a cured film 70 disposed on the first surface 48. The cured film 70 is formed from an anti-reflection coating composition and is configured for minimizing the third intensity 44 of the third ray of light 54. That is, the cured film 70 minimizes the ghost image 20 so that the primary image 14 presented by the head-up display is a singular image that is clear, crisp, and bright. In one non-limiting embodiment, the cured film 70 may be disposed on both the first surface 48 and the second surface 50. In another non-limiting embodiment, the cured film 70 may only be disposed on the first surface 48 and may not be disposed on the second surface 50.

The cured film 70 may be disposed on the first surface 48 in any suitable manner. For example, the anti-reflection coating composition may be sprayed or rolled onto the first surface 48 and then baked to form the cured film 70. The cured film 70 may have a thickness 72 (FIG. 3) of from 35 μm to 65 μm, e.g., from 40 μm to 55 μm, or 50 μm.

Figure 4:
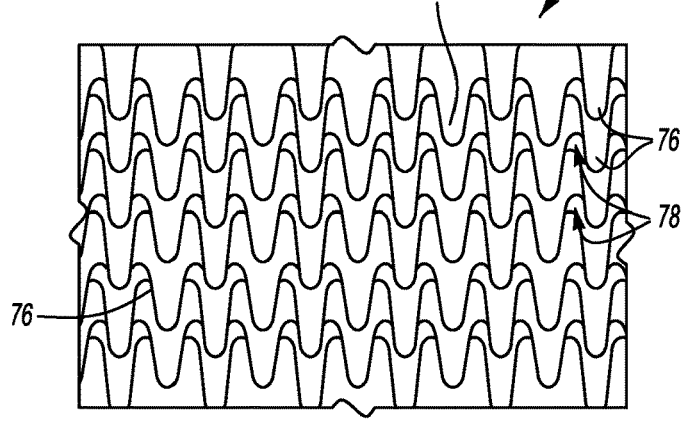
FIG. 4 is a schematic illustration of a perspective, magnified view of a portion of one embodiment of the cured film of FIG. 3.

In one non-limiting embodiment described with reference to FIG. 4, the cured film 70 may have a moth-eye structure 74 that includes a plurality of peaks 76 and a plurality of troughs 78 defined between adjacent ones of the plurality of peaks 76. That is, the moth-eye structure 74 may mimic a structure of an eye of a moth and may disrupt and minimize the reflectance of the second portion 60 (FIG. 3) of the first ray of light 38. The moth-eye structure 74 may be formed from a roll-roll embossing process such that the cured film 70 is reproducible and stable. For example, the moth-eye structure 74 may be embossed into a photopolymer using a master tool and, as such, the manufacturing process for the moth-eye structure 74 may be comparatively more stable than processes such as sputter coating, physical vapor deposition, and chemical vapor deposition.

The anti-reflection coating composition may be characterized as a 1% anti-reflection coating composition such that the cured film 70 reflects only 1% of the first ray of light 38 off the first surface 48. Conversely, the cured film 70 may ensure that the first portion 58 is 99% of the first ray of light 38 such that the second ray of light 52 has the second intensity 42 of at least 93 arbitrary units based on the first intensity 40 of 100 arbitrary units. A non-limiting example of a suitable anti-reflection coating composition is commercially available from Dexerials Corporation of Tokyo, Japan.

Importantly, the cured film 70 may also minimize the third intensity 44 of the third ray of light 54. That is, since the cured film 70 minimizes reflection of the second portion 60 off the first surface 48, comparatively more light may emit from the second surface 50 as the second ray of light 52 such that comparatively less light reflects off the second surface 50 towards the first surface 48, which thereby also minimizes the third intensity 44 of the third ray of light 54. Stated differently, the cured film 70 may be configured for minimizing reflection of the first ray of light 38 from the first surface 48, maximizing the second intensity 42, and minimizing the third intensity 44.

As such, the cured film 70 may minimize or squelch the ghost image 20. More specifically, as set forth above and described with reference to FIG. 3, the second ray of light 52 may form the primary image 14 having a first luminance 80. The third ray of light 54 may form the ghost image 20 that is offset from the primary image 14 with respect to the second surface 50. The ghost image 20 may have a second luminance 82 that is less than the first luminance 80.

However, because the head-up display system 10 includes the cured film 70 disposed on the lens 46, a ratio of the first luminance 80 to the second luminance 82 may be less than 1:0.02. For example, the ratio may be less than 1:0.015. Therefore, the cured film 70 minimizes the second luminance 82 such that the ghost image 20 is not visible to the operator 16 through the windshield 18 when viewed from the operator eyebox 28. That is, the cured film 70 may significantly diminish the third intensity 44 and the second luminance 82 such that the operator 16 cannot perceive the ghost image 20. As such, the primary image 14 is presented through the windshield 18 as a clear, single, bright image. Advantageously, the ghost image 20 may not be visible at the windshield 18 when viewed from the top 32 of the operator eyebox 28. Therefore, the head-up display system 10 presents clear, singular, bright primary images 14 even for comparatively tall operators 16.

Figure 5:
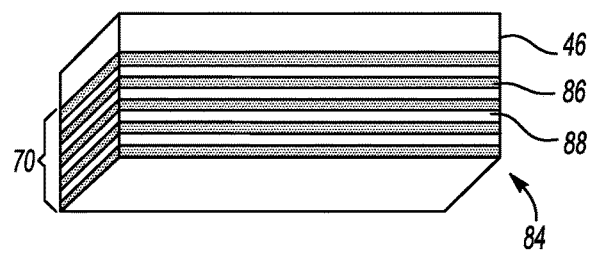
FIG. 5 is a schematic illustration of a perspective, cross-sectional view of another embodiment of the cured film of FIG. 3.

Referring now to FIG. 5, in another non-limiting embodiment, the cured film 70 may have a stacked structure 84 that includes a first plurality of layers 86 each disposed adjacent and in contact with a respective one of a second plurality of layers 88. That is, each of the second plurality of layers 88 may be sandwiched between two of the first plurality of layers 86 to form an alternating pattern of the stacked structure 84. Each of the first plurality of layers 86 may be formed from silicon dioxide and each of the second plurality of layers 88 may be formed from tantalum oxide. The stacked structure 84 may include, for example, nine total layers 86, 88. A non-limiting example of a suitable anti-reflection coating composition for forming the cured film 70 having the stacked structure 84 is commercially available under the tradename ARHard® from Jenoptik Optical Systems of Jupiter, Fla.

Therefore, the head-up display system 10 presents clear and crisp primary images 14 during operation. In particular, the cured film 70 disposed on the first surface 48 minimizes and substantially eliminates the ghost image 20 by maximizing transmission of the first ray of light 38 through the lens 46 and by minimizing reflection of the second portion 60 of the first ray of light 38 off the first surface 48. The anti-reflection coating composition is economical and simple to reproduce, and forms the cured film 70 capable of squelching the ghost image 20 even for: comparatively high incident angles 56 for which comparatively high levels of reflectance usually occur; light that has the s-polarization state; and/or comparatively tall operators 16 who view the primary image 14 from the top 32 of the operator eyebox 28.

While the best modes for carrying out the disclosure have been described in detail, those familiar with the art to which this disclosure relates will recognize various alternative designs and embodiments for practicing the disclosure within the scope of the appended claims.

The invention claimed is:

1. A head-up display system comprising:
   a projector configured for emitting a first ray of light having a first intensity;
   a lens having a first surface facing the projector and a second surface spaced apart from the first surface;
   wherein the first ray of light enters the lens at the first surface and defines an incident angle therebetween;
   wherein the lens is configured for refracting the first ray of light to emit from the second surface:
      a second ray of light having a second intensity that is less than the first intensity, the second ray of light exiting the lens at the second surface; and
      a third ray of light that is parallel to the second ray of light and has a third intensity that is less than the second intensity, the third ray of light exiting the lens at the second surface;
      wherein the first intensity is 100 arbitrary units, the second intensity is at least 93 arbitrary units, and the third intensity is less than 0.1 arbitrary unit;
      wherein the second ray of light forms a primary image originating from the lens and having a first luminance, and the third ray of light forms a ghost image originating from the lens that is offset from the primary image with respect to the second surface and has a second luminance that is less than the first luminance;
   a windshield facing the second surface such that the lens is disposed between the projector and the windshield; and
   a cured film disposed on the first surface and not disposed on the second surface and formed from an anti-reflection coating composition, wherein the cured film is configured for minimizing the third intensity.

2. The head-up display system of claim 1, wherein the lens is formed from a transparent dielectric material.

3. The head-up display system of claim 2, wherein the transparent dielectric material has a refractive index at a wavelength of 588 nm of from 1.45 to 1.6.

4. The head-up display system of claim 2, wherein the lens is formed from polymethyl methacrylate.

5. The head-up display system of claim 2, wherein the lens is formed from polycarbonate.

6. The head-up display system of claim 1, wherein the first ray of light has an s-polarization state.

7. The head-up display system of claim 1, wherein the cured film has a thickness of from 35 μm to 65 μm and has a moth-eye structure including a plurality of peaks and a plurality of troughs defined between adjacent ones of the plurality of peaks; and
   further wherein the cured film is configured for minimizing reflection of the first ray of light from the first surface, maximizing the second intensity, and minimizing the third intensity.

8. The head-up display system of claim 1, wherein the cured film has a stacked structure including a first plurality of layers each disposed adjacent and in contact with a respective one of a second plurality of layers, wherein each of the first plurality of layers is formed from silicon dioxide and each of the second plurality of layers is formed from tantalum oxide.

9. A head-up display system comprising:
   a projector configured for emitting a first ray of light having a first intensity and an s-polarization state;
   a lens having a first surface facing the projector and a second surface spaced apart from the first surface, wherein the lens is formed form a transparent dielectric material having a refractive index at a wavelength of 588 nm of from 1.45 to 1.6;
   wherein the first ray of light enters the lens at the first surface and defines an incident angle therebetween;
   wherein the lens is configured for refracting the first ray of light to emit from the second surface:
      a second ray of light having a second intensity that is less than the first intensity, the second ray of light exiting the lens at the second surface; and
      a third ray of light that is parallel to the second ray of light and has a third intensity that is less than the second intensity, the third ray of light exiting the lens at the second surface;
      wherein the first intensity is 100 arbitrary units, the second intensity is at least 93 arbitrary units, and the third intensity is less than 0.1 arbitrary unit;
      wherein the second ray of light forms a primary image originating from the lens and having a first luminance, and the third ray of light forms a ghost image originating from the lens that is offset from the primary image with respect to the second surface and has a second luminance that is less than the first luminance;
   a windshield facing the second surface such that the lens is disposed between the projector and the windshield; and
   a cured film disposed on the first surface and not disposed on the second surface and formed from an anti-reflection coating composition;
   wherein the cured film has a thickness of from 35 μm to 65 μm and has a moth-eye structure including a plurality of peaks and a plurality of troughs defined between adjacent ones of the plurality of peaks;
   further wherein the cured film is configured for minimizing reflection of the first ray of light from the first surface, maximizing the second intensity, and minimizing the third intensity; and
   wherein the primary image is visible at the windshield by an operator from an operator eyebox and the ghost image is not visible at the windshield by the operator from the operator eyebox.

10. The head-up display system of claim 9, wherein a ratio of the first luminance to the second luminance is 1:0.001.

11. The head-up display system of claim 9, wherein the cured film has a stacked structure including a first plurality of layers each disposed adjacent and in contact with a respective one of a second plurality of layers, wherein each of the first plurality of layers is formed from silicon dioxide and each of the second plurality of layers is formed from tantalum oxide.

12. A head-up display system for displaying a primary image to an operator of a vehicle having a windshield, the head-up display system comprising:
   a projector configured for emitting a first ray of light, the first ray of light having a first intensity of 100 arbitrary units;
   a lens spaced apart from the projector, the lens including a first surface and a second surface, the first surface and the second surface positioned on opposite sides of the lens, the lens disposed so that the first surface faces the projector; and
   a cured film disposed on the first surface and not disposed on the second surface, the cured film comprising a moth-eye structure including a plurality of peaks and a plurality of troughs defined therebetween,
   wherein, during operation of the head-up display system in the vehicle, the first ray of light is refracted by the lens and exits the lens at the second surface as a second ray of light to form the primary image and as a third ray of light to form a ghost image, the second ray of light having a second intensity of at least 93 arbitrary units and the third ray of light having a third intensity of less than 0.1 arbitrary units.

13. The head-up display system of claim 12, wherein the primary image is visible to the operator of the vehicle from an operator eyebox defined by an area in the vehicle where the operator views the windshield.

14. The head-up display system of claim 13, wherein the operator eyebox is defined by the area in front of the operator so that the primary image is visible without tilting or rotating a head of the operator more than 20 degrees up, 20 degrees down, 20 degrees right, or 20 degrees left.

15. The head-up display system of claim 14, wherein, during operation, the primary image is visible to the operator when viewed from the operator eyebox and the ghost image is not visible to the operator when viewed from the operator eyebox.

16. The head-up display system of claim 15, wherein the first ray of light has an s-polarization state.

17. The head-up display system of claim 15, wherein the lens is formed from a transparent dielectric material.

18. The head-up display system of claim 17, wherein the transparent dielectric material has a refractive index at a wavelength of 588 nm of from 1.45 to 1.6.

* * * * *